(12) United States Patent
Lawson et al.

(10) Patent No.: US 7,816,447 B2
(45) Date of Patent: Oct. 19, 2010

(54) REACTOR SYSTEMS AND POLYMERIZATION PROCESSES USING MULTI-ZONE CIRCULATING REACTORS

(75) Inventors: Kevin Wayne Lawson, Petiville (FR); Lawrence Carl Smith, Houston, TX (US); Randell Wayne Dickey, Baytown, TX (US); Robert Tan Li, Houston, TX (US); Prasadarao Meka, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 877 days.

(21) Appl. No.: 11/632,199

(22) PCT Filed: Aug. 23, 2004

(86) PCT No.: PCT/US2004/027282

§ 371 (c)(1),
(2), (4) Date: Jan. 16, 2007

(87) PCT Pub. No.: WO2006/022736

PCT Pub. Date: Mar. 2, 2006

(65) Prior Publication Data

US 2008/0045675 A1    Feb. 21, 2008

(51) Int. Cl.
*C08F 2/34* (2006.01)
*C08F 297/00* (2006.01)
*B01J 19/24* (2006.01)

(52) U.S. Cl. .............. 525/53; 525/52; 526/65; 526/918; 422/134

(58) Field of Classification Search ............ 526/65, 526/918; 422/134; 525/52, 53
See application file for complete search history.

(56) References Cited

U.S. PATENT DOCUMENTS

| | | | | |
|---|---|---|---|---|
| 4,621,952 | A * | 11/1986 | Aronson | 406/138 |
| 4,640,963 | A * | 2/1987 | Kreider et al. | 526/67 |
| 5,698,642 | A | 12/1997 | Govoni et al. | |
| 5,728,353 | A | 3/1998 | Govoni et al. | |
| 6,413,477 | B1 | 7/2002 | Govoni et al. | |
| 7,514,508 | B2 * | 4/2009 | Meier et al. | 526/65 |
| 7,524,903 | B2 * | 4/2009 | Mei et al. | 526/65 |
| 2002/0061264 | A1 | 5/2002 | Govoni et al. | |
| 2004/0072971 | A1 | 4/2004 | Govoni et al. | |

FOREIGN PATENT DOCUMENTS

| EP | 0 154 334 | 9/1985 |
|---|---|---|
| WO | 97/36942 | 10/1997 |

OTHER PUBLICATIONS

P. Galli; "MultiZone Circulating Reactor: the novel frontier of the polyolefins technology", Ninth Int'l. Business Forum on Specialty Polyolefins (SPO '99), Schotland Business Research, Inc. © 1999, pp. 387-408.

M. Covezzi, et al., "The multizone circulating reactor technology", Chemical Engineering Science, 56, pp. 4059-4067, (2001).

* cited by examiner

*Primary Examiner*—Fred M Teskin
(74) *Attorney, Agent, or Firm*—Kevin M. Faulkner

(57) ABSTRACT

The invention relates to the production of polymers using polymerization processes and reactor systems including a plurality of multi-zone circulating reactors. In particular, the invention relates to the production of impact copolymers using reactor systems including a plurality of multi-zone circulating reactors.

6 Claims, 7 Drawing Sheets

REACTOR SYSTEMS AND POLYMERIZATION PROCESSES USING MULTI-ZONE CIRCULATING REACTORS

CROSS REFERENCE TO RELATED APPLICATIONS

This application is a 371 National Stage Application of International Application No. PCT/US2004/027282, filed Aug. 23, 2004, the disclosures of which are herein incorporated by reference in their entireties.

FIELD OF THE INVENTION

The invention relates to the polymerization processes and reactor systems including a plurality of multi-zone circulating reactors. In particular, the invention relates to the production of impact copolymers using reactor systems including a plurality of multi-zone circulating reactors.

BACKGROUND

Propylene impact copolymers are commonly used in a variety of applications where stiffness and impact resistance are desired such as molded and extruded automobile parts, household appliances, luggage and furniture, etc. Propylene homopolymers are often unsuitable for such applications because they are too brittle and have low impact resistance particularly at lower temperatures, whereas propylene impact copolymers are well suited for applications such as these.

A propylene impact copolymer or heterophasic copolymer or block copolymer generally contains at least two phases or components, a homopolymer component or continuous matrix and a copolymer component or dispersed phase. These two components are usually produced in a sequential polymerization process wherein the homopolymer produced in a first reactor is transferred to a second reactor where copolymer is produced and incorporated within the matrix of the homopolymer component. The copolymer component has "rubbery" characteristics and provides the desired impact resistance, whereas the homopolymer component provides overall stiffness.

A variety of methods and reactor systems have been proposed to prepare such propylene impact copolymers among other types of polymers. For example, U.S. Pat. No. 5,698,642 discloses a process for the gas-phase polymerization of olefins carried out in two interconnected polymerization zones, to which one or more α-olefins CH=CHR are fed in the presence of a catalyst under polymerization conditions and from which the produced polymer is discharged. The growing polymer particles flow through a first polymerization zone under fast fluidization conditions (e.g., fast fluidization section), leave said first zone and enter a second polymerization zone through which they flow in a densified form under the action of gravity (e.g., dense phase section), leave said second zone and are reintroduced into the first polymerization zone, thus establishing a circulation of polymer between the two polymerization zones. Such polymerization schemes are commonly referred to in industry as multi-zone circulating reactors or multi-zone circulating reactor systems. U.S. Pat. No. 5,698,642 also discloses that the multi-zone circulating reactor may be combined with conventional technologies such as in bulk or in the gas phase, either in a fluidized bed or a stirred bed in a sequential multi-stage processes (Col. 9, lines 35-44). See also, e.g., U.S. Pat. No. 6,413,477 and U.S. Patent Application Publication No. 2002/0061264 A 1.

However, past endeavors have yet to provide for new reactor system configurations and polymerization processes that provide for efficient and/or economical methods to produce desired polymers such as impact copolymers.

SUMMARY

The invention provides for a reactor system comprising a plurality of multi-zone circulating reactors connected in fluid communication.

The plurality of multi-zone circulating reactors may comprise at least a first multi-zone circulating reactor (MZCR) and at least a second multi-zone circulating reactor (MZCR).

In another embodiment, the invention provides for a process to produce polymers, such as impact copolymers, the process comprising contacting at least one catalyst system and monomers in a reactor system comprising a plurality of multi-zone circulating reactors connected in fluid communication.

DETAILED DESCRIPTION

Figure 1:
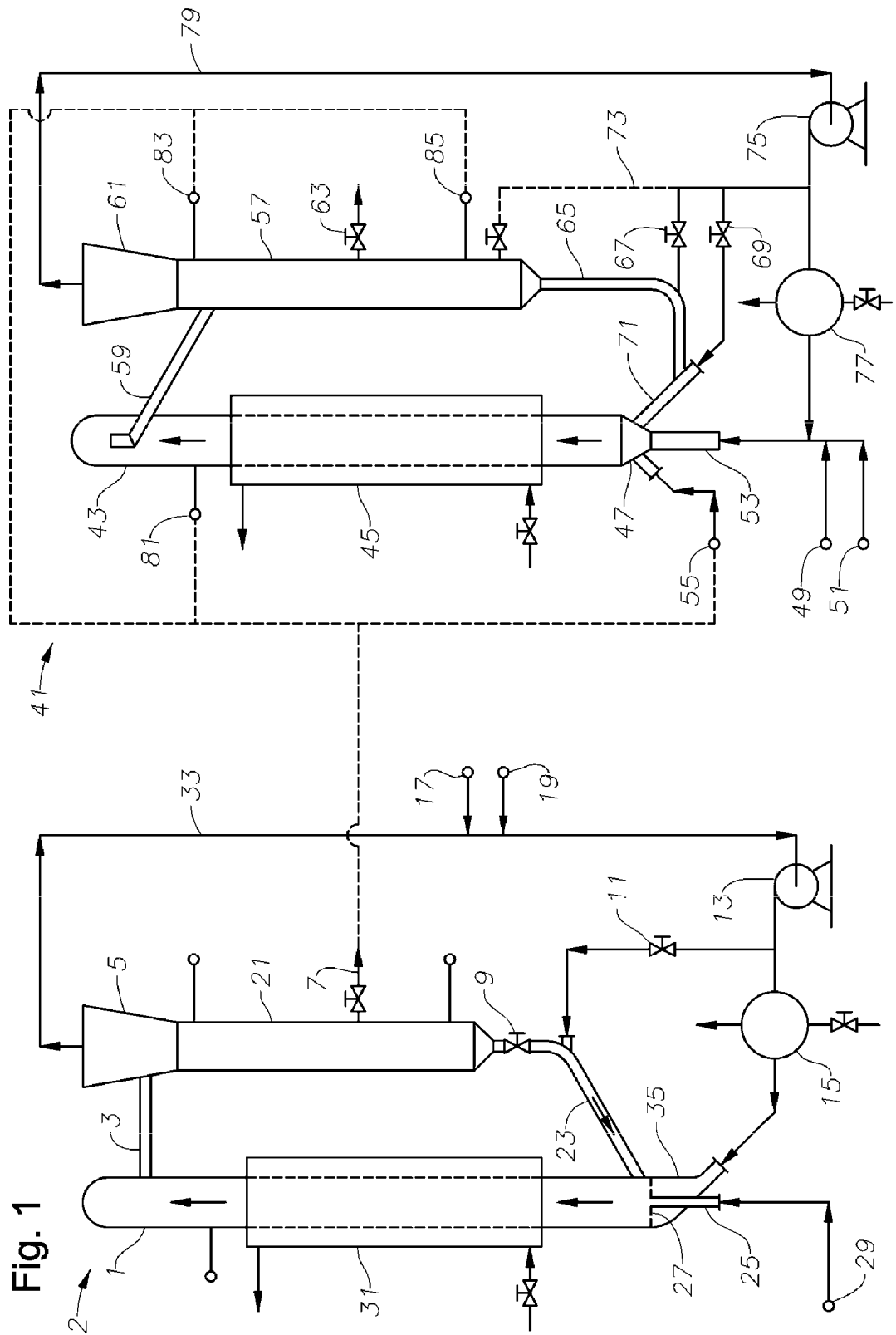
FIG. 1 provides a schematic of multi-zone circulating reactors connected in series.

Various specific embodiments, versions and examples of the invention will now be described, including preferred embodiments and definitions that are adopted herein for purposes of understanding the claimed invention. However, for purposes of determining infringement, the scope of the "invention" will refer to the appended claims, including their equivalents, and elements or limitations that are equivalent to those that are recited. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

As used herein, the new numbering scheme for the Periodic Table of Elements Groups is used as described in HAWLEY'S CONDENSED CHEMICAL DICTIONARY 852 (John Wiley & Sons, 13th ed. 1997).

As used herein, the term "polypropylene polymer(s)" or "propylene polymer(s)" refers to homopolymers, copolymers, terpolymers, and interpolymers made from propylene derived units.

As used herein, unless differentiated, "polymerization" includes homopolymerization, copolymerization, terpolymerization, and interpolymerization.

As used herein, "crystalline" is defined as having identifiable peak melting points above about 100° C. as determined by Differential Scanning Calorimetry (DSC peak melting temperatures).

As used herein, "isotactic" is defined as having at least 40% isotactic pentads according to analysis by $^{13}$C-NMR.

As used herein, "molecular weight" means weight average molecular weight (Mw). Mw is determined using Gel Permeation Chromatography. Molecular Weight Distribution (MWD) means Mw divided by number average molecular weight (Mn). (For more information, see U.S. Pat. No. 4,540,753 to Cozewith et al. and references cited therein, and in Verstrate et al., 21 *Macromolecules* 3360 (1998)). The "Mz" value is the high average molecular weight value, calculated as discussed by A. R. Cooper in CONCISE ENCYCLOPEDIA OF POLYMER AND ENGINEERING 638-39 (J. I. Kroschwitz, ed. John Wiley & Sons 1990).

As used herein, Melt Flow Rates (MFR) are determined in accordance with ASTM D 1238-95 Condition L.

As used herein, when a polymer is referred to as comprising a monomer, the monomer is present in the polymer in the polymerized form of the monomer or in the derivative form of the monomer.

As used herein, the intrinsic viscosity (IV) for the polypropylene homopolymer or copolymers of propylene with alpha-olefins with carbon atoms 2 or 4 to 12 is determined by the standard procedure outlined in "PREPARATIVE METHODS OF POLYMER CHEMISTRY", written by W. R. Sorenson and T. W. Campbell, pages 43-50, 2nd edition published by Interscience Publishers., 1968, or determined according to the ASTM D1601-78 procedure. The intrinsic viscosity measurement involves the use of a standard capillary viscosity measuring device. The intrinsic viscosity for the or copolymer or terpolymer in an impact copolymer is measured using the equation below;

$$(IV)_{copolymer} = \frac{(IV)ICP - (1 - Fc)(IV)_{homopolymer}}{Fc}$$

where, $F_c$ is the fraction of the copolymer or terpolymer in the ICP. The fraction of the copolymer or terpolymer is determined by conventional procedures, including infrared spectroscopy analysis, low field solid state nuclear magnetic resonance spectrascopy (LF NMR) or fractionation of the ICP in hot xylene into soluble and insolubles fractions, followed by analysis of the fractions by $^{13}$C-NMR.

As used herein, a multi-zone circulating reactor ("MZCR") refers generally, unless otherwise specified, to any reactor that comprises at least a first reaction zone and at least a second reaction zone, wherein the at least first reaction zone (such as a fast fluidization section) and the at least second reaction zone (such as a dense phase section) are connected in a manner to provide circulation of the forming or growing polymer between the reaction zones.

As used herein, plurality refers to two or more.

As used herein, a reactor system refers to a system comprising a plurality of multi-zone circulating reactors and all other necessary and optional equipment for the polymerization of olefins such as propylene.

Unless otherwise specified, reactors may be connected in parallel or series. In certain embodiments, reactors are in fluid communication regardless of the hardware applied, such as pipes, conduits, etc.

As used herein, L-valve, refers to any non mechanical configuration of piping whereby the flowrate of granular solid materials may be controlled or assisted to some degree by the addition of a conveying gas.

As stated above, a multi-zone circulating reactor refers generally to any reactor that comprises at least a first reaction zone and at least a second reaction zone, wherein the at least first reaction zone and the at least second reaction zone are connected in a manner to provide circulation of the forming or growing polymer between the reaction zones. In certain embodiments, the growing polymer flows through the first polymerization zone under fast fluidization conditions. In the second polymerization zone, the growing polymer flows in a densified form under the action of gravity. The two polymerization zones are appropriately interconnected by methods and equipment well within the skill in the art. The material balance is maintained by feeding in monomers and catalysts and other components described below and discharging polymer. For more details see U.S. Pat. Nos. 5,698,642, 6,413,477 and U.S. Patent Application Publication No. 2002/0061264 A1.

Multi-Zone Circulating Reactors (MZCRs)

In an embodiment, the invention provides for a reactor system comprising a plurality of multi-zone circulating reactors (MZCRs). The multi-zone circulating reactors may be connected in series. For example, a reactor system may comprise a first multi-zone circulating reactor and a second multi-zone circulating reactor; each MZCR may be independently selected from among the MZCR configurations known in the art. The MZCRs may be the same or different. FIG. 1 is one embodiment of this invention in which MZCRs of two different configurations 2 (41) have been connected in series by means of hard pipe through which the polymer produced in the first reactor is transferred to the second reactor by means of an operating pressure difference between the two reactors at the points of the connections.

As shown in 2, at least a first multi-zone circulating reactor may comprise a first vertical cylindrical section 1 equipped with a catalyst/polymer feedline 29, and a second vertical cylindrical section 21 equipped with a polymer discharge system 7; the upper region of the first section 1 is connected by a first line 3 to (or just below) a solid/gas separator 5 which in turn is connected to the upper region of the second section 21; the lower region of the second section 21 is connected by a second line 23 to the lower region of the first section 1; and the solid/gas separator 5 is connected by means of a recycle line for the gaseous mixture 33 to the first reactor 1 in a region 35 at the bottom of said first section 1 below the point of entry of the second line 23.

As shown in 41, at least a second multi-zone circulating reactor may comprise a first vertical cylindrical section 43 equipped with a catalyst/polymer feedline 55, and a second vertical cylindrical section 57 equipped with a polymer discharge system 63; the upper region of the first section 43 is connected by a first line 59 to (or just below) a solid/gas separator 61 which in turn is connected to the upper region of the second section 57; the lower region of the second section 57 is connected by a second line 65 to the lower region of the first section 43 and the solid/gas separator 61 is connected by means of a recycle line for the gaseous mixture 79 to the first reactor 43 in a region 47 at the bottom of said first section 43 below the point of entry of the second line 65.

The at least a first multi-zone circulating reactor and the at least a second multi-zone circulating reactor are connected in fluid communication by any means known in the art.

In certain embodiments, the product produced in the first reactor is withdrawn at a point 7 of high solids density, and conveyed by means of differential pressure(s) to the second reactor and introduced at a introduction points 55 (81) (83) (85). Differential pressures required to convey said product from the first reactor to the second reactor may be applied by any means according to the present invention. As noted above, FIG. 1 is but one embodiment of this invention in which differential pressure is supplied by difference in operating pressures in the two reactors (at the points of connection); and the connection between the reactors is an appropriately sized system of valves and pipe. Any mass balance issues arising from any embodiment may be resolved by recycle of gas from the second reactor back to the first reactor or other recovery system.

In an embodiment, the reactors are equipped with gas distributor means 27, for example a grid, located between the point of entry of the second line 23 and the region 35 at the bottom of this reactor. As an alternative, the gas distributor means can be replaced by a cylindrical line 53, through which the gas flows at high velocity and which is connected to the first section 43 by a frustoconical section 47 whose angle of inclination to the vertical is, for example, 45° or less, alternatively, 30° or less, and alternatively, 10° or less. In certain embodiments, both the catalyst (through line 55) and/or the polymer coming from the second vertical cylindrical sections 57 (21) through the line 71 (55) can be conveyed through this frustoconical connection.

A valve 9 for controlling the polymer flow rate is generally inserted between the second section 21 and the second line 23. This valve 9 can be either of the mechanical or of the non-mechanical type.

In the case where gas distributor means 27 are present, some or all the components of the catalyst/polymer can advantageously be injected via a third line 25 into said first cylindrical section 1 at a point above the gas distributor means.

In certain embodiments, the recycle line for the gaseous mixture 33 (79) is equipped with a compressor 13 (75), a cooling system 15 (77) and systems for introducing, together or separated, monomers 17 (49) and molecular weight regulator 19 (51). Two cooling systems, one upstream and one downstream the compressor, can be present. The first section of each reactor 1 (43) may be equipped with external cooling means 31 (45) such as wall heat exchangers.

In certain embodiments, the first line 3 leaves the upper region of the first section laterally. The lateral exit of the solid/gas mixture from the first section 1 contributes in a substantial way to the dynamic stability of the entire reaction system.

The upper region of the first reactor 1 can have a cylindrical shape with a diameter equal to that of the reactor or preferably can be of frustoconical geometry with the broad end uppermost.

The first line can be horizontal 3 or have a slope in the direction of gravity 59 in order to facilitate discharge of polymer. The second line 23 can appropriately be inclined downwards and can be connected (at a point immediately downstream of the first 9) via a line 11 to the gas recirculation line or recycle line for gaseous mixture 33 at a point downstream of the compressor 13. In this way, the flow of polymer is assisted by the stream of gas under pressure coming from the recycle line, avoiding stagnant zones of polymer in the line itself and at the point of introduction into the reactor 1.

The system of connection between the lower regions of the sections can also be of the second type described in FIG. 1, in which the circulation of the polymer is obtained by a nonmechanical L-valve 65 operated by the gas taken from the recycle line 79 through the line 67. The L-valve is connected to a line 71 which leads into the first reactor section 43, said line 71 being connected via the line 69 to the recycle line 79. Through this line, the polymer is carried back to the interior of the first reactor section 43 by an appropriate stream of gas coming from the line 69. The recycle line 79 can optionally also be connected to the second reactor section 57 by line 73.

Batch Transfer System

Figure 2:
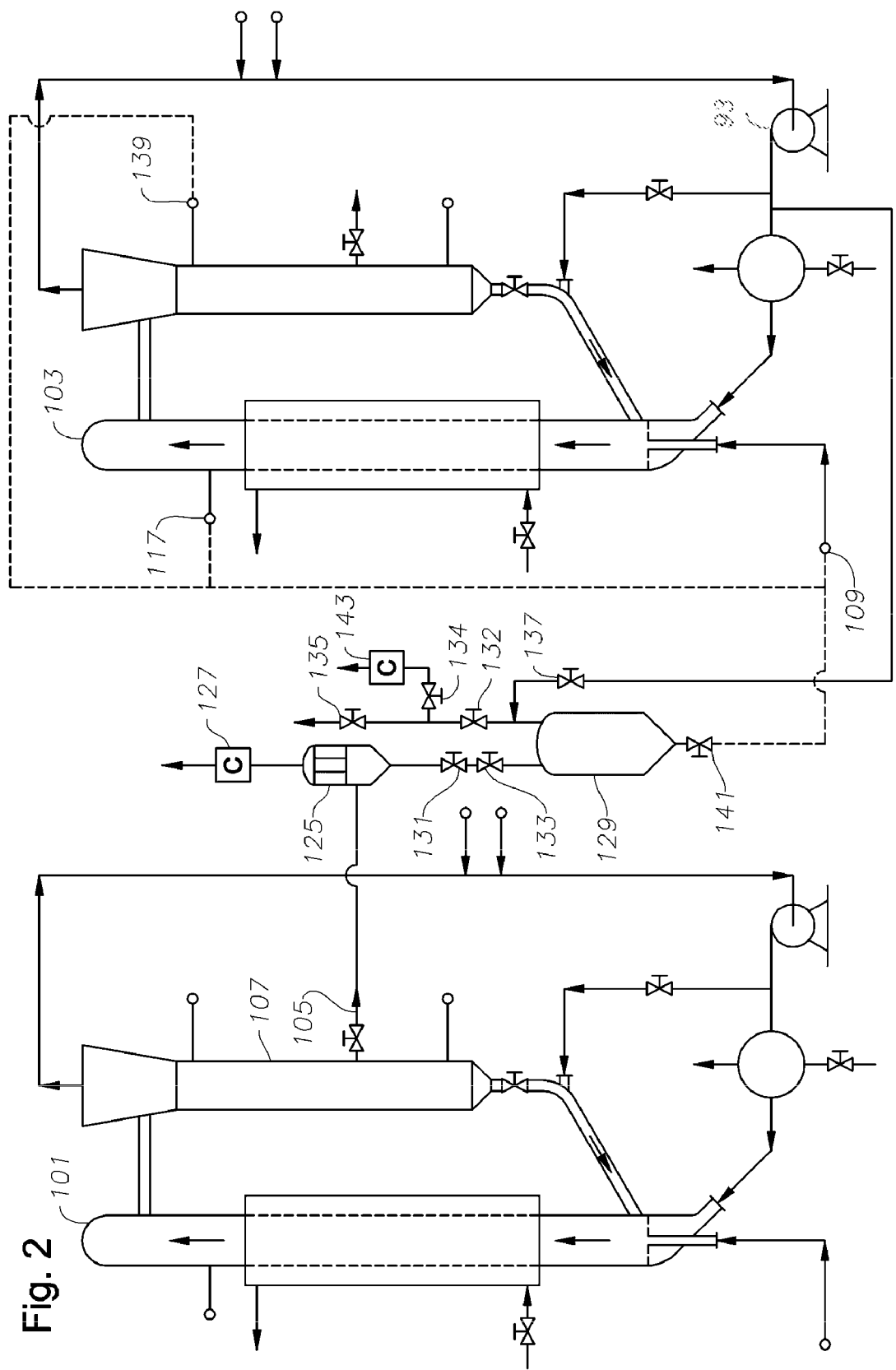
FIG. 2 provides a schematic of an inventive multi-zone circulating reactor system with an optional degassing system.

In another embodiment, the reactor system may include a batch transfer system for conveying product from a first MZCR reactor to a second MZCR with minimal transfer of monomer. FIG. 2 is one embodiment of this invention in which MZCRs of similar configurations have been connected in series by means of a batch transfer system through which the polymer produced in the first reactor 101 is transferred to the second reactor 103 by means of a batch transfer system which minimizes the transfer of monomer from the first reactor to the second reactor. In certain embodiments, the advantages of such a system relative to the embodiment illustrated in FIG. 1 are realized by better differentiation of the reaction environments/compositions within the two reactors, allowing a broader separation in the properties of the product material produced in each reactor.

In certain embodiments, the product produced in the first reactor 101 is withdrawn continuously or batchwise at a point of high solids density 107 through line 105, and conveyed by means of differential pressure to a gas-solids separation vessel 125, where the solid product accumulates in the bottom of the vessel and the reactive gas that is withdrawn with the solid product is passed through a filtering medium and optionally recompressed 127 for recovery. The solids accumulated in the bottom of the separation vessel 125 are then conveyed batchwise by means of differential pressure and/or gravity to a second process vessel 129 through process valve(s) 131 (133). The second process vessel 129 can then be optionally further vented to a lower pressure through valve(s) 132 (135) thus, further minimizing the gas transferred with the solid product into the second reactor. The second process vessel 129 is then pressured-up through process line/valve 137 to a sufficient pressure to provide a positive differential pressure between the second process vessel and introduction points 109 (117) (139), where solids may be introduced into the second reactor preferably with gas from the recycle gas compressor 93 on the second reactor. The process valve 141 is then opened and solid product is conveyed by means of differential pressure and optionally gravity to the second reactor and introduced at introduction points 109 (117) (139) suitable to the process such as at points of low solids density. During the solid product transfer to the second reactor, valve 137 may remain open to ensure sufficient differential pressure to maximize solids transfer into the second reactor. Once solid transfer is completed, the optionally open 137 valve is closed and the 141 valve is closed to isolate the second process vessel 129 from the second reactor. The second process vessel 129 may then be depressured through valve(s) 132 (134) to a recompression system for recycling 143 and/or to a low pressure system through valve(s) 132 (135) and the batch cycle is repeated.

The valves employed in this embodiment are preferably of a suitable design and construction to provide extended service life under the conditions of high solids gas flows and/or high cycle times. More preferably the valve(s) at the first reactor discharge line 105 are selected from among the types known in the art as eccentric rotary control valves such a "V-ball" or "Camflex" or others. These are available from vendors such as Masoneilan and Fisher. More preferably the valve(s) at the first reactor discharge line 105 are Camflex valves. Valve(s) 131 (135) (141) are selected from among the types known in the art as High Performance Butterfly Valves or High Performance Ball Valves available from vendors such as Adams Valves, Posi-Seal Valves, KTM Valves and Argus Valves.

The solid separation vessel filter medium is preferably of a suitable design and construction to provide extended service life under the process conditions and adequate protection to gas handling equipment receiving the filtered gas. More preferably, the filter medium is constructed of a polyolefin or nylon fiber in a form known in the art as "bag filter", "sock filter", "filter cartridges", or "filter elements". More preferably, the filter medium consists of sock or bag filters made completely of polypropylene including fabric and stitching. The accumulation of solids on this filter media is minimized by both the design of the gas/solids separation section of the filter below the filter media and the use of reverse flow pulse jet cleaning to remove solids from the filter media.

Semi-Batch Transfer System

Figure 3:
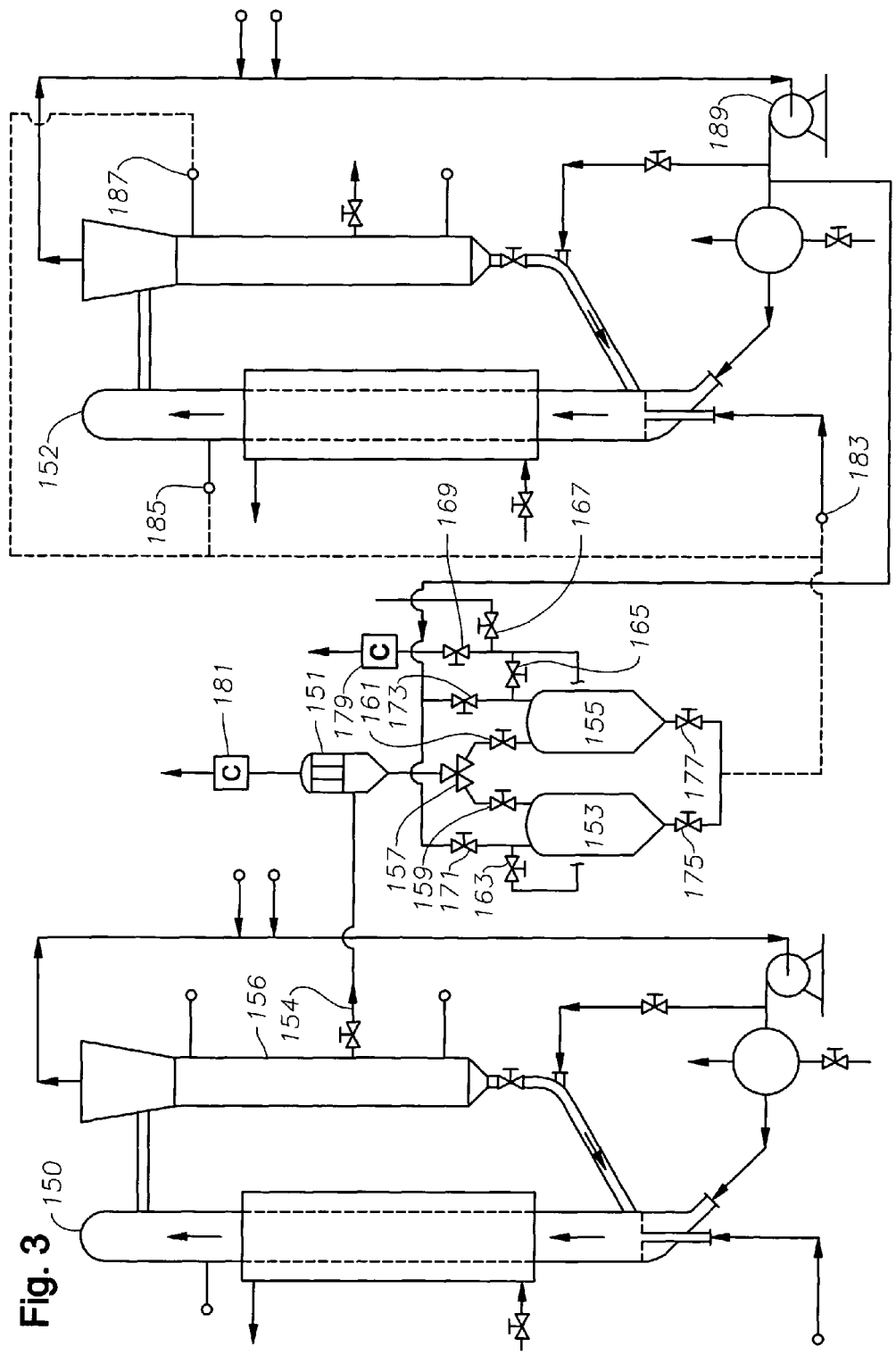
FIG. 3 provides a schematic of an inventive multi-zone circulating reactor system with an optional batch granules transfer and an optional degassing system.

In yet another embodiment, the reactor system may include a semi-batch transfer system for preferentially conveying product from a first MZCR reactor to a second MZCR with minimal transfer of monomer. FIG. 3 is one embodiment of this invention in which MZCRs of similar configurations have been connected in series by means of a semi-batch transfer system through which the polymer produced in the first reactor 150 is transferred to the second reactor 152 by means of a batch transfer system which minimizes the transfer of monomer from the first reactor 150 to the second 152. The advantages of such a system relative to the embodiments illustrated in FIGS. 1 and 2 are realized by better differentiation of the reaction environments/compositions within the two reactors, allowing a broader separation in the properties of the product material produced in each reactor, and smaller transfer system process vessels.

In certain embodiments, the product produced in the first reactor is withdrawn continuously or batchwise at a point of high solids density 156 through line 154, and conveyed by means of differential pressure to a gas-solids separation vessel 151, where the solid product accumulates in the bottom of the vessel and the reactive gas that is withdrawn with the solid product is passed through a filtering medium and optionally recompressed 181 for recovery. The solids accumulated in the bottom of the separation vessel 151 are conveyed continuously by means of differential pressure and/or gravity to either of the two second process vessels 153 (155) through process valve(s) 157 (159) (161). As one of the second process vessels 153 (155) is continuously receiving product, the other 155 (153) is engaged in a batch transfer of solid product into the second reactor. Once full, the second process vessel 153 (155) can be isolated by valve 159 (161) and solid product flow from the separation vessel 151 can be redirected by valve 157 to the awaiting empty second process vessel 155 (153) through valve 161 (159). The full second process vessel 153 (155) can then be optionally further vented to a lower pressure through valve(s) 163 (165) (16); thus, further minimizing the gas transferred with the solid product into the second reactor.

The second process vessel 153 (155) is then pressured up through process line/valve 171 (173) to a sufficient pressure to provide a positive differential pressure between the second process vessel and the point of solids introduction on the second reactor 183 (185) 187, preferably with gas from the recycle gas compressor 189 on the second reactor system. The process valve 175 (177) is then opened and solid product is conveyed by means of differential pressure and optionally gravity to the second reactor and introduced at a point suitable to the process and product properties with preferably low solids density 183 (185) (187). During the solid product transfer to the second reactor, valve 171 (173) may remain open to ensure sufficient differential pressure to maximize solids transfer into the second reactor. Once solid transfer is completed, the optionally open 171 (173) valve is closed and the 175 (177) valve is closed to isolate the second process vessel 153 (155) from the second reactor. The second process vessel 153 (155) may then be depressured through valve(s) 163 (165) (169) to a recompression system for recycling 179 and/or to a low pressure system through 163 (165) (167); and the batch cycle is repeated.

The valves employed in this embodiment are preferably of a suitable design and construction to provide extended service life under the conditions of high solids gas flows and/or high cycle times. More preferably the valve(s) in line 154 are selected from among the types known in the art as eccentric rotary control valves such a "V-ball" or "Camflex" or others. These are available from vendors such as Masoneilan and Fisher. More preferably the valve(s) in line 154 are Camflex valves. Valve(s) 159 (161) (175) (177) are selected from among the types known in the art as High Performance Butterfly Valves or High Performance Ball Valves available from vendors such as Adams Valves, Posi-Seal Valves, KTM Valves and Argus Valves.

The solid separation vessel filter medium is preferably of a suitable design and construction to provide extended service life under the process conditions and adequate protection to gas handling equipment receiving the filtered gas. More preferably, the filter medium is constructed of a polyolefin or nylon fiber in a form known in the art as "bag filter", "sock filter", "filter cartridges", or "filter elements". More preferably, the filter medium consists of sock or bag filters made completely of polypropylene including fabric and stitching. The accumulation of solids on this filter media is minimized by both the design of the gas/solids separation section of the filter below the filter media and the use of reverse flow pulse jet cleaning to remove solids from the filter media.

Eductor System

Figure 4:
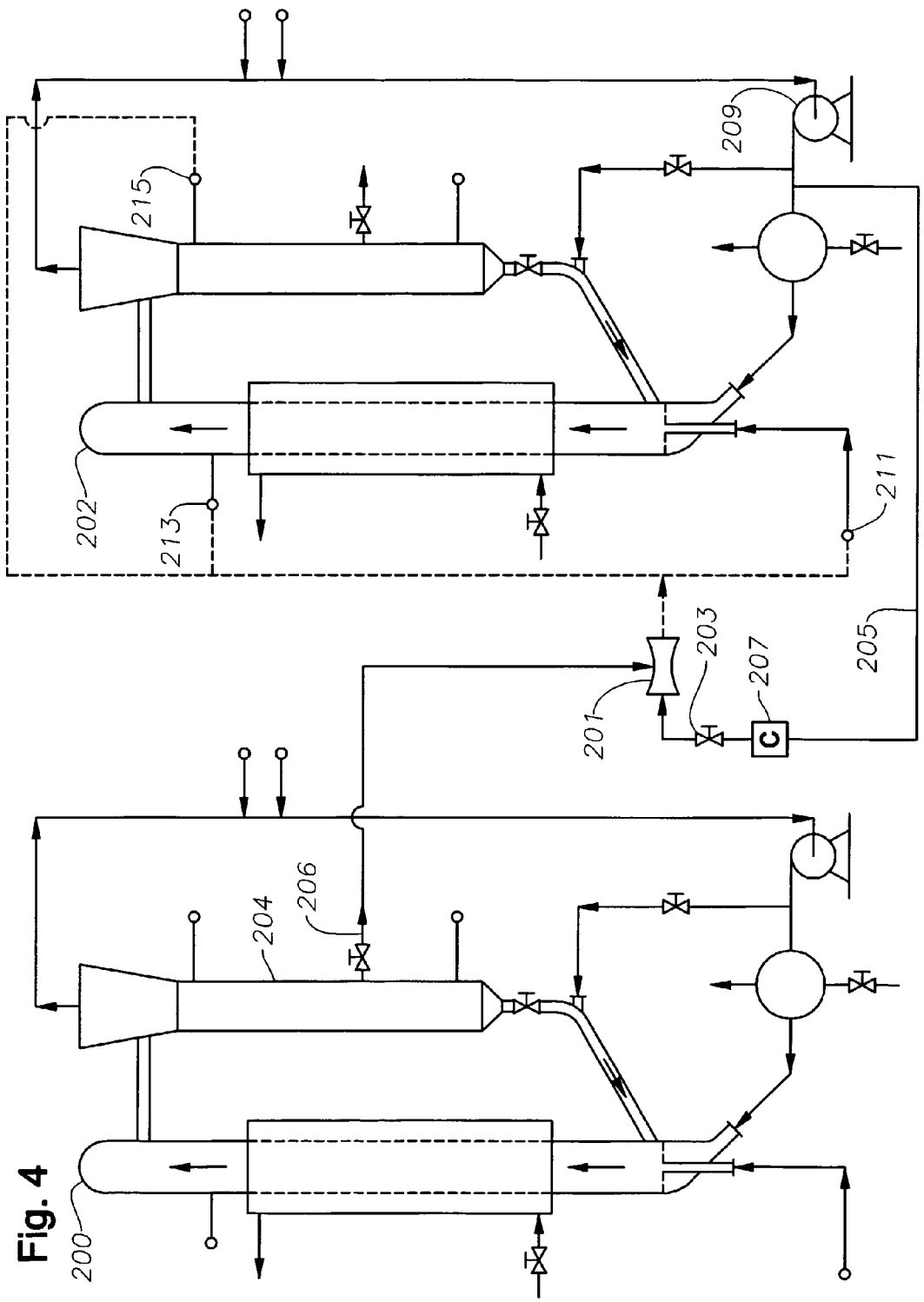
FIG. 4 provides a schematic of an inventive multi-zone circulating reactor system with an optional eductor.

In still another embodiment, the reactor system may include an eductor system for preferentially conveying product from a first MZCR reactor to a second with minimal required operating pressured differences between the two reactors. FIG. 4 is one embodiment of this invention in which MZCRs of similar configurations have been connected in series by means of an eductor system through which the polymer produced in the first reactor 200 is transferred to the second reactor 202 by means of an operating pressure difference between the first reactors and the pressure developed within the eductor 201.

In certain embodiments, the product produced in the first reactor 200 is withdrawn continuously or batchwise at a point of high solids density 204 through line 206, and conveyed by means of differential pressure to the eductor 201. The eductor is supplied with education gas 205 through control valve 203 from the second reactor gas compressor 209, and the gas and product discharged from the first reactor 200 are mixed within the eductor 201 and returned to the second reactor 202 at points 211 (213) (215) suitable to the desired process conditions. Optionally, the education gas 205 may be further compressed by an optional secondary compressor 207 to improve the eductor performance.

L-Valve and Piping Alternatives

Figure 5:
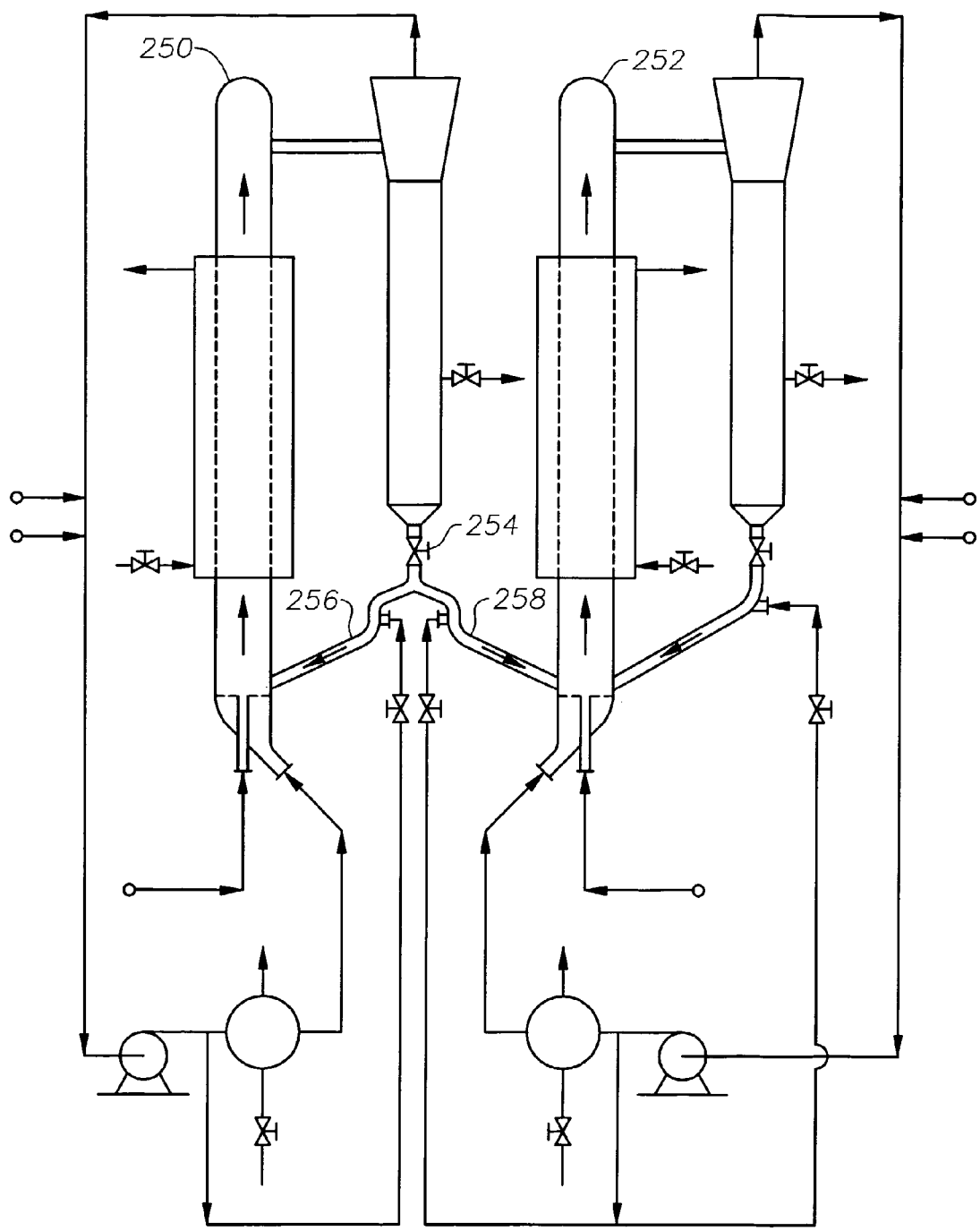
FIG. 5 provides a schematic of an inventive multi-zone circulating reactor system with an optional valve and piping.
Figure 6:
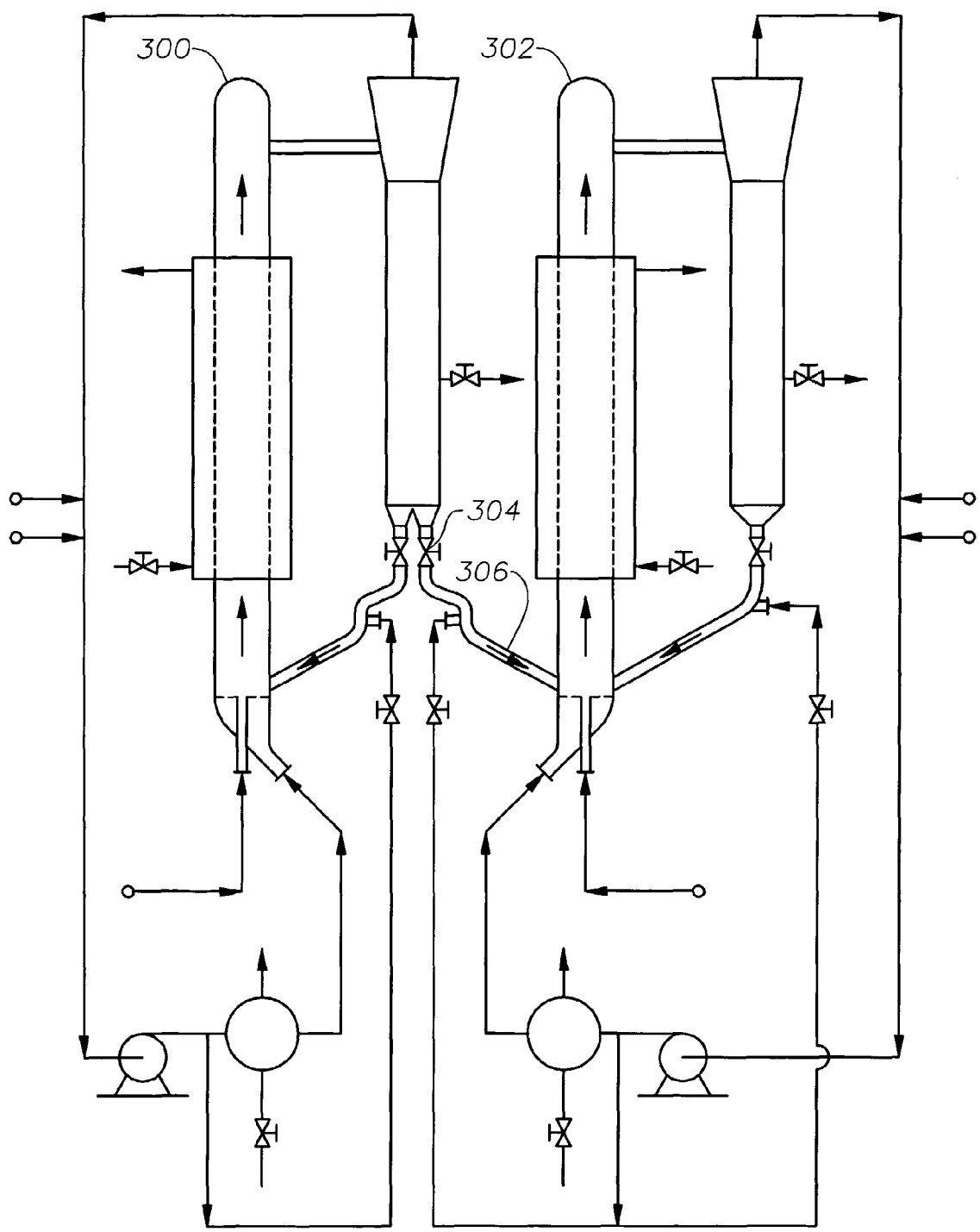
FIG. 6 provides a schematic of an inventive multi-zone circulating reactor system with an optional, alternative valve and piping.
Figure 7:
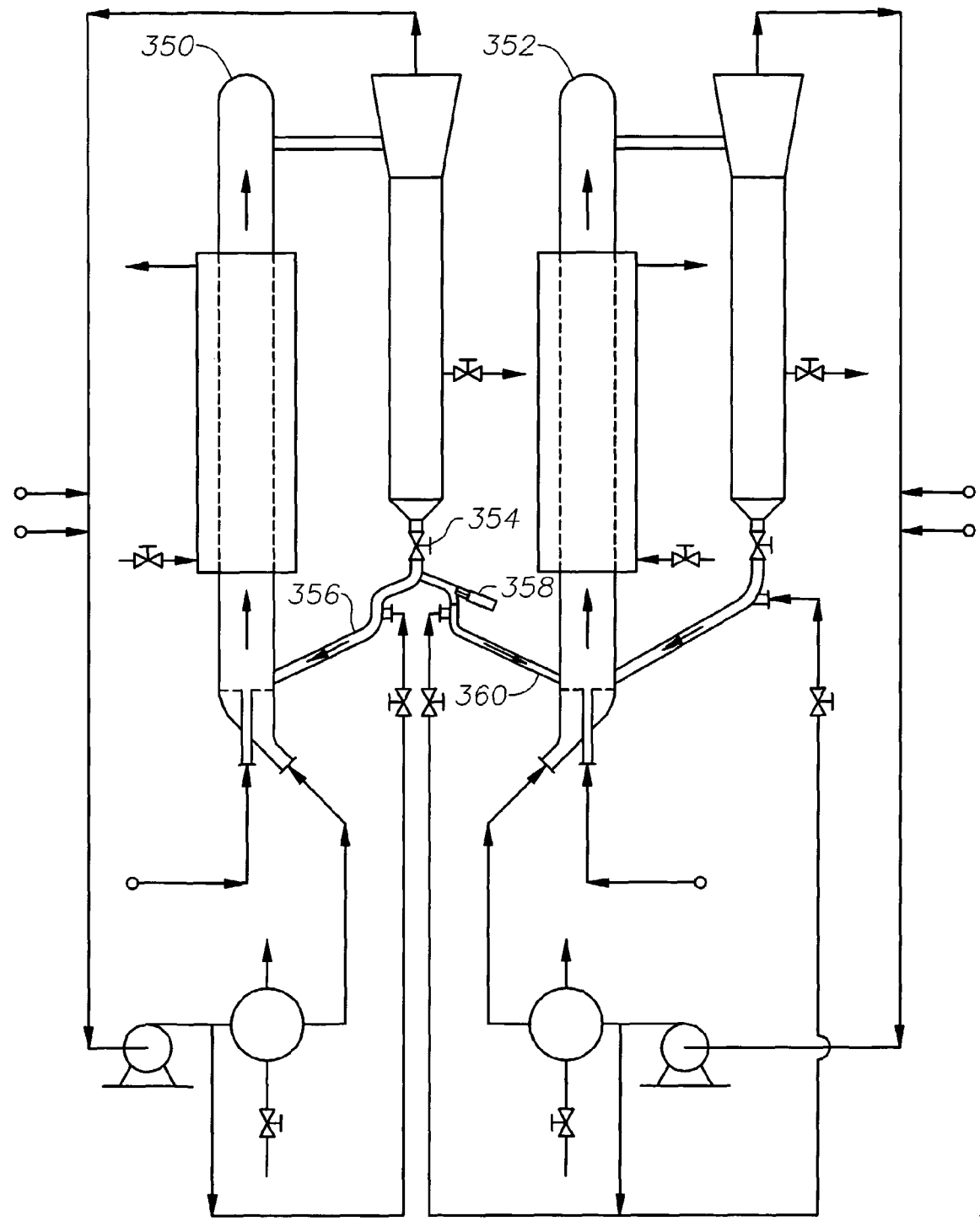
FIG. 7 provides a schematic of an inventive multi-zone circulating reactor system with an optional, alternative valve and piping.

In any of the embodiments described in this section, the reactor system may also include an additional L-valve and associated piping for conveying product from a first MZCR to a second. FIG. 5 is one embodiment of this invention in which MZCRs of similar configurations 250 (252) have been connected in series by means of appropriately sized L-valve system which separates the product stream withdrawn from the settled bed section of the first reactor 250 through valve 254 into a first stream that is conveyed through the L-valve 256 into the fast bed of the first reactor 250 and a second smaller stream 258 that is conveyed to the fast bed section of the second reactor 252. FIG. 6 is one embodiment of this invention in which MZCRs of similar configurations 300 (302) have been connected in series by means of appropriately sized L-valve system which withdraws a product stream from the settled bed section of the first reactor 300 through valve 304 and conveys it through line 306 to the fast bed section of the second reactor. FIG. 7 is one embodiment of this invention in which MZCRs of similar configurations 350 (352) have been connected in series by means of appropriately sized L-valve system which separates the product stream withdrawn from the settled bed section of the first reactor 350 through valve 354 into a first stream that is conveyed through the L-valve 356 into the fast bed of the first reactor 350 and a second small stream that is conveyed through a plug type valve 358 and L-valve 360 to the fast bed section of the second reactor. The plug type valve 358 is provided to allow for batchwise let-down from the first reactor 350 to the second 352 with minimal process fouling. The advantages of such systems relative to the embodiments illustrated in FIGS. 1 through 4 are realized by fewer types and pieces of process equipment to connect the to reactors.

Impact Copolymers (ICP)

The present invention, including any of its embodiments, may be employed to produce polymeric compounds known in the art as impact copolymers. As used herein, the term "impact copolymer" ("ICP") shall mean those blends of polypropylene and rubber which are substantially thermoplastic and have a flexural modulus in the range of 10,000 to 250,000 (70 to 1725 MPa). The ICPs have a "polypropylene component" and a "rubber component". Most typically, useful ICPs have a polypropylene content in the range of 40 wt % to 96 wt % in one embodiment, and from 50 wt % to 90 wt % in another embodiment; and a rubber content in the range of up to 60 wt % in one embodiment, and a rubber content of up to 40 wt % in another embodiment. The rubber may include up to 100 wt % ethylene derived units or other $C_3$ to $C_{10}$ α-olefin derived units by weight of the rubber, or from 0.5 to 100 wt % ethylene derived units or other $C_3$ to $C_{10}$ α-olefin derived units by weight of the rubber in another embodiment, or from 0.5 to 60 wt % ethylene derived units or other $C_3$ to $C_{10}$ α-olefin derived units in yet another embodiment.

In an embodiment, a propylene impact copolymer comprises: (a) from about 40 to 98 wt % by weight Component A based on the total weight of the impact copolymer, Component A comprising propylene homopolymer or copolymer wherein the copolymer comprises 8% or less by weight of weight α-olefins with carbon atoms from 2 to 10, (b) from about 1 to 40% weight of Component B based on the total weight of the impact copolymer, Component B comprising a propylene copolymer or terpolymer comprises from about 35% to about 100% by weight α-olefins with carbon atoms from 2 to 10, and (c) from about 1 to 20% by weight of Component C based on the total weight of the impact copolymer, component C comprising an propylene copolymer or terpolymer wherein the copolymer comprises from about 25 to 60% by weight α-olefins with carbon atoms from 2 to 10.

In another embodiment, a propylene impact copolymer comprises: (a) from about 40 to 98 wt % by weight Component A based on the total weight of the impact copolymer, Component A comprising propylene homopolymer or copolymer wherein the melt flow rate is from 0.5 to 200 g/10 min, preferably from 5 to 150 g/10 min, more preferably 7 to 130 g/10 min, and most preferably from 10 to 120 g/10 min, (b) from about 1 to 40% weight of Component B based on the total weight of the impact copolymer, where in the intrinsic viscosity is from 1 to 10 dl/g, preferably from 1.5 to 9 dl/g, and more preferably 1.5 to 8 dl/, and (c) from about 1 to 20% by weight of Component C based on the total weight of the impact copolymer, where in the intrinsic viscosity is from 2 to 15 gl/g, preferably from 2 to 13 dl/g, and more preferably from 2 to 12 dl/g.

In yet another embodiment, a propylene impact copolymer comprises: (a) from about 40 to 98 wt % by weight Component A based on the total weight of the impact copolymer, Component A comprising propylene homopolymer or copolymer wherein the copolymer, the density is from 0.89 to 0.91 g/cc, (b) from about 1 to 40% weight of Component B based on the total weight of the impact copolymer, Component B comprising a propylene copolymer or terpolymer, where in the density is from 0.86 to 0.95 g/cc, and (c) from about 1 to 20% by weight of Component C based on the total weight of the impact copolymer, component C comprising an propylene copolymer or terpolymer wherein the density is from 0.86 to 0.92 g/cc.

In another embodiment, a propylene impact copolymer comprises: (a) from about 40 to 94 wt % by weight Component A based on the total weight of the impact copolymer, Component A comprising propylene homopolymer or copolymer wherein the copolymer comprises from 8% or less by weight of α-olefins with carbon atoms from 2 to 10, (b) from about 5 to 40% weight of Component B based on the total weight of the impact copolymer, Component B comprising a propylene copolymer or terpolymer comprises from about 0.5 to 20% by weight α-olefins with carbon atoms from 2 to 10, and (c) from about 1 to 20% by weight of Component C based on the total weight of the impact copolymer, component C comprising an propylene copolymer or terpolymer wherein the copolymer comprises from about 0.5 to 20% by weight of α-olefins with carbon atoms from 2 to 10.

In an embodiment, a propylene impact copolymer comprises: (a) from about 40 to 94 wt % by weight Component A based on the total weight of the impact copolymer, Component A comprising propylene homopolymer or copolymer wherein the copolymer comprises from 8% or less by weight of α-olefins with carbon atoms from 2 to 10, (b) from about 5 to 40% weight of Component B based on the total weight of the impact copolymer, Component B comprising a propylene copolymer or terpolymer comprises from about 0.5 to 20% by weight α-olefins with carbon atoms from 2 to 10, where the intrinsic viscosity is from 1.5 to 7 dl/g, preferably from 1.5 to 6 dl/g, and more preferably from 1.5 to 5.5 dl/g, and (c) from about 1 to 20% by weight of Component C based on the total weight of the impact copolymer, component C comprising an propylene copolymer or terpolymer wherein the copolymer comprises from about 0.5 to 20% by weight of α-olefins with carbon atoms from 2 to 10, where the intrinsic viscosity is from 1.0 to 10 dl/g, preferably from 1.0 to 8.5 dl/g, and more preferably from 1.0 to 8 dl/g.

In yet another embodiment, a propylene impact copolymer comprises: (a) from about 40 to 94 wt % by weight Component A based on the total weight of the impact copolymer, Component A comprising propylene homopolymer or copolymer wherein the copolymer comprises from 8% or less by weight of α-olefins with carbon atoms from 2 to 10, (b) from about 5 to 40% weight of Component B based on the total weight of the impact copolymer, Component B comprising a propylene copolymer or terpolymer comprises from about 0.5 to 20% by weight α-olefins with carbon atoms from 2 to 10, where the heat of fusion is from 5 to 25 Joules/g (c) from about 1 to 20% by weight of Component C based on the total weight of the impact copolymer, component C comprising an propylene copolymer or terpolymer wherein the copolymer comprises from about 0.5 to 20% by weight of α-olefins with carbon atoms from 2 to 10, where the heat of fusion is from 5 to 25 Joules/g.

In certain embodiments, the present invention may be employed to produce polymeric compounds known in the art as impact copolymers (ICPs). A propylene impact copolymer or heterophasic copolymer or block copolymer generally contains at least two phases or components, a homopolymer component or continuous matrix and a copolymer component or dispersed phase. ICPs may also refer to those blends of polypropylene and rubber polymers which are substantially thermoplastic and have a flexural modulus in the range of 10,000 to 250,000 (70 to 1725 MPa).

Most typically, useful ICPs have a polypropylene content in the range of 40 wt % to 96 wt % in one embodiment, and from 50 wt % to 90 wt % in another embodiment; and a rubber content in the range of up to 60 wt % in one embodiment, and a rubber content of up to 40 wt % in another embodiment. The rubber may include up to 100 wt % ethylene derived units or other $C_4$ to $C_{12}$ α-olefin derived units by weight of the rubber, or from 0.5 to 100 wt % ethylene derived units or other $C_4$ to $C_{12}$ α-olefin derived units by weight of the rubber in another embodiment, or from 0.5 to 60 wt % ethylene derived units or other $C_4$ to $C_{12}$ α-olefin derived units in yet another embodiment.

The polypropylene may be homopolymers of polypropylene, propylene based copolymers, or combinations of the two. The term "polypropylene" may be defined to mean any propylene based polymer having a propylene content of at least 80 wt %. In most applications, it will be desirable that the polypropylene phase be continuous or nearly continuous.

In some embodiments, the rubber phase exists in discrete domains dispersed throughout the polypropylene polymer phase. Most commonly, the rubber will be an ethylene-propylene rubber or an ethylene-propylene terpolymer rubber, however, other rubber compositions may be used. The term "rubber" can be defined as any essentially non-crystalline polymeric component having a low glass transition temperature (typically ≦−35° C.), typically a copolymer of propylene derived units and at least one other monomer derived unit selected from ethylene and at least one $C_4$ to $C_{10}$ α-olefin. The base ICP may also include additional fillers, pigments, stabilizers and property modifiers.

In one embodiment of this invention, a plurality of MZCRs may be employed to produce impact copolymers. In addition to producing the impact copolymers of compositions known in the art, the present invention provides an expanded capability to produce impact copolymers with broadened rubber phase molecular weight distributions and ethylene compositions. In any of the embodiments of this invention, polypropylene polymer may be produced in the first MZCR with broadened molecular weight distribution and composition as described in for example, U.S. Pat. Nos. 5,698,642, 6,413,477, and U.S. Patent Application Publication 2002/0061264 A; upon transfer by one of the embodiments of this patent to the second MZCR a rubber phase may be incorporated within the polypropylene granule to produce ICPs having a rubber phase with broadened molecular weight distribution and/or broadened ethylene concentration distribution. Such ICP's are produced by differentiation of the reactant concentrations in the two sections of the second MZCR; for example, in the fast fluidization zone hydrogen, ethylene, and propylene concentrations can be established to produce a low molecular weight (relatively high hydrogen) ethylene-propylene rubber with relatively high ethylene concentrations (relatively high ethylene); when the product enters the dense settling zone, hydrogen and ethylene can be stripped with propylene to produce a higher molecular weight ethylene-propylene rubber with relatively low ethylene concentrations. As known in the art, Ziegler-Natta catalyzed ethylene-propylene reactions in standard gas phase reactors typically lead to ethylene-propylene rubber products having a distribution including a high molecular weight, ethylene rich product and a relatively low molecular weight ethylene lean product. The present invention provides a means to balance or cancel out this effect, therefore providing a means to improved impact copolymer product properties.

ICP components may be further described according to the following.

Polymer Component A

In accordance with the present invention, the Polymer Component A (PCA) comprises a propylene homopolymer, or a copolymer of propylene, or some mixtures propylene homopolymers and copolymers.

In certain embodiments, the polypropylene of the present invention is predominately crystalline, i.e., it has a melting point generally greater than 110° C., alternatively greater than 115° C., and most preferably greater than 130° C. The term "crystalline," as used herein, characterizes those polymers which possess high degrees of inter- and intra-molecular order. It has a heat of fusion greater than 60 J/g, alternatively at least 70 J/g, alternatively at least 80 J/g, more preferably at least 100 J/g, as determined by DSC analysis. The heat of fusion is dependent on the composition of the polypropylene.

The PCA can vary widely in composition. For example, substantially isotactic polypropylene homopolymer or propylene copolymer containing equal to or less than 10 weight percent of other monomer, i.e., at least 90% by weight propylene can be used. Further, the polypropylene can be present in the form of a graft or block copolymer, in which the blocks of polypropylene have substantially the same stereoregularity as the propylene-alpha-olefin copolymer so long as the graft or block copolymer has a sharp melting point above 110° C. and alternatively above 115° C. and alternatively above 130° C., characteristic of the stereoregular propylene sequences. The PCA may be a combination of homopolypropylene, and/or random as described herein. When the above PCA is a random copolymer, the percentage of the copolymerized alpha-olefin in the copolymer is, in general, up to 9% by weight, alternatively 0.5%-8% by weight, alternatively 2%-6% by weight. The preferred alpha-olefins contain 2 or from 4 to 10 carbon atoms. One, or two or more alpha-olefins can be copolymerized with propylene Exemplary alpha-olefins may be selected from the group consisting of ethylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

The molecular weight of the PCA can be between 10,000 to 5,000,000, alternatively 50,000 to 500,000, with a polydispersity index (PDI) between 1.5 to 40.0.

There is no particular limitation on the method for preparing PCA of the invention. However, for example, the polymer is a propylene homopolymer obtained by homopolymerization of propylene in the first reactor of the multi-zone circulating series reactors. Copolymers may be obtained by copolymerizing propylene and an alpha-olefin having 2 or from 4 to 10 carbon atoms in the first reactor of the multi-zone circulating reactor. Polymerization methods include bulk using a traditional Ziegler-Natta catalyst or a single-site, metallocene catalyst system.

Polymer Component (B)

The polymer component B is a co- or terpolymer of ethylene with alpha-olefins having carbon atoms from 3 to 12, having a level of 1 to 40 wt %, ethylene content from 0.5 to 100%, and intrinsic viscosity from 1 to 10 dl/g. The molecular weight distribution could be from 2 to 20, preferably from 2 to 15, most preferably from 2 to 10. The density of the co- or terpolymer can vary from 0.86 to 0.96 g/cc.

In one embodiment, the polymer component B(PCB) is an elastic polymer with a moderate level of crystallinity due to stereoregular propylene sequences. The PCB may comprise: (A) a propylene homopolymer in which the stereoregularity is disrupted in some manner such as by regio-inversions; (B) a random propylene copolymer in which the propylene stereoregularity is disrupted at least in part by comonomers or (C) a combination of (A) and (B).

In another embodiment, the PCB further comprises a non-conjugated diene monomer to aid in vulcanization and other chemical modification of the blend composition. The amount of diene present in the polymer is preferably less than 10% by weight, and more preferably less than 5% by weight. The diene may be any non-conjugated diene which is commonly used for the vulcanization of ethylene propylene rubbers including, but not limited to, ethylidene norbornene, vinyl norbornene, and dicyclopentadiene.

In one embodiment, the PCB is a random copolymer of propylene and at least one comonomer selected from ethylene, $C_4$-$C_{10}$ α-olefins, and combinations thereof. In a particular aspect of this embodiment, the copolymer includes ethylene-derived units in an amount ranging from a lower limit of 2%, 5%, 6%, 8%, or 10% by weight to an upper limit of 20%, 25%, or 28% by weight. This embodiment may also include propylene-derived units present in the copolymer in an amount ranging from a lower limit of 72%, 75%, or 80% by weight to an upper limit of 98%, 95%, 94%, 92%, or 90% by weight. These percentages by weight are based on the total weight of the propylene and ethylene-derived units; i.e., based on the sum of weight percent propylene-derived units and weight percent ethylene-derived units being 100%.

The ethylene composition of a polymer can be measured as follows. A thin homogeneous film is pressed at a temperature of about 150° C. or greater, then mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=82.585−111.987X+30.045 $X^2$, wherein X is the ratio of the peak height at 1155 $cm^{-1}$ and peak height at either 722 $cm^{-1}$ or 732 $cm^{-1}$, whichever is higher. The concentrations of other monomers in the polymer can also be measured using this method.

Comonomer content of discrete molecular weight ranges can be measured by Fourier Transform Infrared Spectroscopy (FTIR) in conjunction with samples collected by GPC. One such method is described in Wheeler and Willis, Applied Spectroscopy, 1993, vol. 47, pp. 1128-1130. Different but similar methods are equally functional for this purpose and well known to those skilled in the art.

Comonomer content and sequence distribution of the polymers can be measured by $^{13}C$ nuclear magnetic resonance ($^{13}C$ NMR), and such method is well known to those skilled in the art.

In one embodiment, the PCB comprises a random propylene copolymer having a narrow compositional distribution. In another embodiment, the polymer is a random propylene copolymer having a narrow compositional distribution and a melting point as determined by DSC of from 25° C. to 110° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intramolecular composition distribution (i.e., randomness) of the copolymer may be determined by $^{13}C$ NMR, which locates the comonomer residues in relation to the neighboring propylene residues. The intermolecular composition distribution of the copolymer is determined by thermal fractionation in a solvent. A typical solvent is a saturated hydrocarbon such as hexane or heptane. The thermal fractionation procedure is described below. Typically, approximately 75% by weight, preferably 85% by weight, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), preferably 10% (relative), of the average weight % comonomer of the copolymer. The copolymer has a narrow compositional distribution if it meets the fractionation test described above. To produce a copolymer having the desired randomness and narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

The crystallinity of the polymers may be expressed in terms of heat of fusion. Embodiments of the present invention include polymers having a heat of fusion, as determined by DSC, ranging from a lower limit of 1.0 J/g, or 3.0 J/g, to an upper limit of 50 J/g, or 10 J/g. Without wishing to be bound by theory, it is believed that the polymers of embodiments of the present invention have generally isotactic crystallizable propylene sequences, and the above heats of fusion are believed to be due to the melting of these crystalline segments.

The crystallinity of the polymer may also be expressed in terms of crystallinity percent. The thermal energy for the highest order of polypropylene is estimated at 189 J/g. That is, 100% crystallinity is equal to 189 J/g. Therefore, according to the aforementioned heats of fusion, the polymer has a polypropylene crystallinity within the range having an upper limit of 65%, 40%, 30%, 25%, or 20%, and a lower limit of 1%, 3%, 5%, 7%, or 8%.

The level of crystallinity is also reflected in the melting point. The term "melting point," as used herein, is the highest peak among principal and secondary melting peaks as determined by DSC, discussed above. In one embodiment of the present invention, the polymer has a single melting point. Typically, a sample of propylene copolymer will show secondary melting peaks adjacent to the principal peak, which are considered together as a single melting point. The highest of these peaks is considered the melting point. The polymer preferably has a melting point by DSC ranging from an upper limit of 110° C., 105° C., 90° C., 80° C., or 70° C., to a lower limit of 0° C., 20° C., 25° C., 30° C., 35° C., 40° C., or 45° C. Typically, a sample of the alpha-olefin copolymer component will show secondary melting peaks adjacent to principal peak; these are considered together as single melting point. The highest of the peaks is considered the melting point.

In one embodiment, the PCB has a Mooney viscosity, ML(1+4) @ 125° C., of 100 or less, 75 or less, 60 or less, or 30 or less. Mooney viscosity, as used herein, can be measured as ML(1+4) @ 125° C. according to ASTM D1646, unless otherwise specified.

The PCB used in embodiments of the present invention can have a tacticity index (m/r) ranging from a lower limit of 4 or 6 to an upper limit of 8, 10, or 12. The tacticity index, expressed herein as "m/r", is determined by $^{13}C$ nuclear magnetic resonance (NMR). The tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one embodiment, the PCB has isotactic stereoregular propylene crystallinity. The term "stereoregular" as used herein means that the predominant number, i.e. greater than 80%, of the propylene residues in the polypropylene or in the polypropylene continuous phase of a blend, such as impact copolymer exclusive of any other monomer such as ethylene, has the same 1,2 insertion and the stereochemical orientation of the pendant methyl groups is the same, either meso or racemic.

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity (mm fraction) of a propylene copolymer can be determined from a $^{13}C$ NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

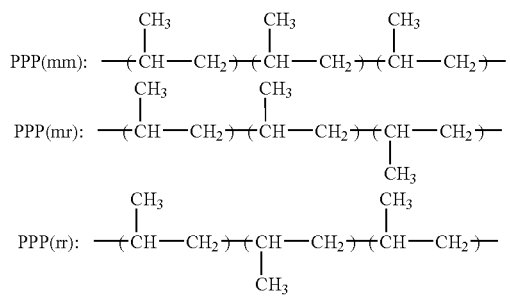

The $^{13}C$ NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The PCB may have a triad tacticity of three propylene units, as measured by $^{13}C$ NMR, of 75% or greater, 80% or greater, 82% or greater, 85% or greater, or 90% or greater.

In embodiments of the present invention, the PCB has a melt flow rate (MFR) of 5000 dg/min or less, alternatively, 300 dg/min or less, alternatively 200 dg/min or less, alternatively, 100 dg/min or less, alternatively, 50 dg/min or less, alternatively, 20 dg/min or less, alternatively, 10 dg/min or less, or, alternatively, 2 dg/min or less. The determination of the MFR of the polymer is according to ASTM D1238 (230° C., 2.16 kg).

In certain embodiments, the PCB of the present invention may be produced in the presence of a chiral metallocene catalyst with an activator and optional scavenger. The use of single site catalysts is preferred to enhance the homogeneity of the polymer. As only a limited tacticity is needed many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a hetero-atom, generally a nitrogen atom, but possibly also a phosphorus atom or phenoxy group connected to a group 4 transition metal, preferably titanium but possibly zirconium or hafnium. A further example is $Me_5CpTiMe_3$ activated with $B(CF)_3$ as used to produce elastomeric polypropylene with an Mn of up to 4 million. See Sassmannshausen, Bochmann, Rosch, Lilge, *J. Organomet. Chem.* (1997) 548, 23-28.

Other possible single site catalysts are metallocenes which are bis cyclopentadienyl derivatives having a group transition metal, preferably hafnium or zirconium. Such metallocenes may be unbridged as in U.S. Pat. No. 4,522,982 or U.S. Pat. No. 5,747,621. The metallocene may be adapted for producing a polymer comprising predominantly propylene derived units as in U.S. Pat. No. 5,969,070 which uses an unbridged bis(2-phenyl indenyl)zirconium dichloride to produce a homogeneous polymer having a melting point of above 79° C. The cyclopentadienyl rings may be substituted and/or part of polycyclic systems as described in the above U.S. Patents.

In another embodiment, for example, a typical polymerization process comprises a polymerization in the presence of a catalyst comprising a chiral bis(cyclopentadienyl) metal compound and either 1) a non-coordinating compatible anion activator, or 2) an alumoxane activator. An exemplary catalyst system is described in U.S. Pat. No. 5,198,401. Exemplary prochiral catalysts suitable for the preparation of crystalline and semi-crystalline polypropylene copolymers include those described in U.S. Pat. Nos. 5,145,819; 5,304,614; 5,243,001; 5,239,022; 5,329,033; 5,296,434; 5,276,208; 5,672,668; 5,304,614; and 5,374,752; and EP 549 900 and 576 970.

In another embodiment, the PCB could be co or terpolymers of ethylene and alpha-olefins with carbon atoms from 3 to 12, with ethylene varying from 0.5 to 100 wt %, an intrinsic viscosity (IV) varying from 1.0 to 10, and a molecular weight distribution varying from 2 to 40, preferably 2 to 15, more preferably 2 to 10 and most preferably 2 to 5.

Polymer Component (C)

The polymer component C (PCC) is a co- or terpolymer of ethylene with alpha-olefins having carbon atoms from 3 to 12, having a level of 1 to 20 wt %, ethylene content from 0.5 to 60%, and intrinsic viscosity from 1 to 15 dl/g. The molecular weight distribution could be from 2 to 20, preferably from 2 to 15, most preferably from 2 to 10. The density of the co- or terpolymer can vary from 0.86 to 0.91 g/cc.

The polymer components A, B, and C could be made with either Ziegler-Natta or single site or metallocene catalyst systems. In certain embodiments, Component A is made in the first multi-zone circulating reactor of the series connected reactors and Component B is made in the fast fluidization section of the second multi-zone circulating reactors of the series connected reactors. In certain embodiments, Component B is made in the dense phase section of the second multi-zone circulating reactor.

The ICP useful in the present invention may be made using any appropriate catalyst system. In one embodiment, the process includes the use of a metallocene catalyst system. Such systems are well known in the art, and are able to produce ICPs having certain desirable characteristics. The ICP may have a narrow molecular weight distribution Mw/Mn ("MWD") of lower than 4.0 in one embodiment, lower than 3.5 in another embodiment, and lower than 3.0 in yet another embodiment, and lower than 2.5 in yet another embodiment. These molecular weight distributions are obtained in the absence of visbreaking using peroxide or other post reactor treatment designed to reduce molecular weight. The ICP has a weight average molecular weight (Mw as determined by GPC) of at least 100,000, at least 200,000 in another embodiment, and a melting point (Mp) of at least 145° C., at least 150° C. in another embodiment, at least 152° C. in yet another embodiment, and at least 155° C. in yet another embodiment.

The products made in multi-zone circulating reactors connected in series, will have unique properties. For instance, the polypropylene homopolymer made in the first multi-zone circulating reactor of the series reactors, will have broad molecular weight distribution (MWD) depending on the level H2 concentration in the fast fluidization section and dense phase section, and uniform structure throughout the reactor. The broad MWD will provide enhanced processability in the final converting processes (injection molding, blow molding, extrusion, thermoforming, etc). In addition, the broad MWD will provide enhanced flexural modulus or stiffness, which otherwise is not possible. The MWD in the homo polypropylene also provides improvement in impact strength, gloss, Rockwell hardness, heat distortion temperature (HDT).

The impact copolymers made using the multi-zone circulating reactors connected in series, in addition to the benefits already mentioned for the homo polypropylene, will much enhanced impact strength due to better and uniform dispersion of the elastomer phase in the polypropylene granules. The impact strength improvement is in Gardner impact or drop weight impact as typically done at −30° C., room temperature notched Izod (RTNI), and/or low temperature notched izod, Charpy impact strength at or below the room temperature, and multi-axial impact strength as determined at or below the room temperature. In addition, the elastomer phase composition distribution could be controlled precisely based on the conditions chosen in the fluidization section and the dense phase section. The broad composition distribution of the elastomer phase will provide unique and interesting physical properties in terms of stiffness and impact, and other properties. The broad MWD possible in the elastomer phase will have improved processability as already mentioned above. In addition, the surface characteristics for the molded products, will have superior properties, such as gloss, lack of imperfections such as flow marks or tiger stripping, better resistance to stress whitening. The products made in the series multi-zone circulating reactors, will have better clarity, enhanced toughness, broad flexural modulus capability as well.

In addition, products with superior softness, toughness, better low temperature impact properties could be made using the multi-zone circulating reactors connected in series.

In one desirable embodiment, the metallocene produced impact copolymer is reactor produced, wherein the "polypropylene component" of the copolymer is produced in one stage, and the "rubber component" is produced in another stage in the presence of the polypropylene component.

Another important feature of metallocene produced ICPs is the amount of amorphous polypropylene they contain, as determined by hexane extractables levels. The ICPs of this invention may be characterized as having low amorphous polypropylene in the polypropylene component (non-rubber component) of the ICP, less than 3% by weight in one embodiment, less than 2% by weight in another embodiment, and less than 1% by weight in yet another embodiment. In yet another embodiment, there is no measurable amorphous polypropylene.

The following racemic metallocenes are most suitable for preparing the ICP compositions in one embodiment of the invention: rac-dimethylsiladiyl(2-iPr,4-phenylindenyl)$_2$zirconium dichloride; rac-dimethylsiladiyl(2-iPr,4-[1-naphthyl]indenyl)$_2$zirconium dichloride; rac-dimethylsiladiyl(2-iPr, 4-[3,5-dimethylphenyl]indenyl)$_2$zirconium dichloride; rac-dimethylsiladiyl(2-iPr, 4-[ortho-methyl-phenyl]indenyl)$_2$zirconium dichloride; rac-diphenylsiladiyl(2-methyl-4-[1-naphthyl]indenyl)$_2$zirconium dichloride, rac-diphenylsiladiyl(2-methyl-4-[1-phenyl]indenyl)$_2$zirconium dichloride, rac-diphenylsiladiyl(2-iPr-4-[1-phenyl]indenyl)$_2$zirconium dichloride, rac-diphenylsiladiyl(2-iPr-4-[1-naphthyl]indenyl)$_2$zirconium dichloride, rac-dimethylsiladiyl(2-iPr-4-[1-phenyl])(2-methyl-4-[1-phenyl])zirconium dichloride, rac-dimethylsiladiyl(2-iPr-4-[1-naphthyl])(2-methyl-4-[1-naphthyl])zirconium dichloride, or mixed combinations thereof.

It will be immediately apparent to those skilled in the art that certain modifications to these metallocene species are not likely to result in significantly modified ICP composition though activity or ease of synthesis may be impacted. As such, the present invention contemplates the use of other metallocenes.

Metallocenes are generally used in combination with some form of activator in order to create an active catalyst system. The term "activator" is defined herein to be any compound or component, or combination of compounds or components, capable of enhancing the ability of one or more metallocenes to polymerize olefins. Alkylalumoxanes such as methylalumoxane (MAO) are commonly used as metallocene activators. Generally alkylalumoxanes contain 5 to 40 of the repeating units ("x"):

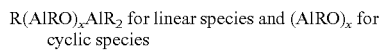

R(AlRO)$_x$AlR$_2$ for linear species and (AlRO)$_x$ for cyclic species where R is a $C_1$-$C_8$ alkyl including mixed alkyls. Compounds in which R is methyl are particularly preferred. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP-B1-0 279 586, EP-A-0 594-218 and WO 94/10180.

Ionizing activators may also be used to activate metallocenes. These activators are neutral or ionic, or are compounds such as tri(n-butyl)ammonium tetrakis(pentafluorophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activator combination, see for example, WO 94/07928. Embodiments of the metallocene and activator system useful in making the ICP of the present invention is further disclosed in U.S. Pat. Nos. 6,384,142 and 6,342,566.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (each incorporated herein by reference). These desirable methods of preparation wherein metallocenes are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and naphthyl.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge at +1, yet retain sufficient lability to permit displacement by an ethylenically or acetylenically unsaturated monomer during polymerization.

The use of ionizing compounds not containing an active proton but capable of producing both the active metallocene cation and a non-coordinating anion is also known. See, for example, EP-A-0 426 637 and EP-A-0 573403 (each incorporated herein by reference). An additional method of making the ionic catalysts uses ionizing uses ionizing anion precursors which are initially neutral Lewis acids but form the cation and anion upon ionizing reaction with the metallocene compounds, for example the use of tris(pentafluorophenyl)borane. See EP-A-0 520732 (incorporated herein by reference). Ionic catalysts for addition polymerization can also be prepared by oxidation of the metal centers of transition metal compounds by anion precursors containing metallic oxidizing groups along with the anion groups, see EPA-0 495 375 (incorporated herein by reference).

Where the metal ligands include halogen (for example, bis-cyclopentadienyl zirconium dichloride) which are not capable of ionizing abstraction under standard conditions, they can be converted via know alkylation reactions with organometallic compounds such as lithium or aluminum hydrides or alkyls, alkylalumoxanes, Grgnard, reagents, etc. See EP-A-0 500 944 and EP-A1-0 570 982 (each incorporated herein by reference) for in situ processes describing the reaction of alkyl aluminum compounds with dihalo-substituted metallocene compounds prior to or with the addition of activating anionic compounds.

Methods for supporting ionic catalysts comprising metallocene cations and NCA are described in WO 9950311, U.S. Pat. Nos. 5,643,847 and 5,972,823 (each fully incorporated herein by reference).

When the activator for the metallocene supported catalyst composition is a NCA, preferably the NCA is first added to the support composition followed by the addition of the metallocene catalyst. When the activator in MAO, preferably the NAO and metallocene catalyst are dissolved together in solution. The support is then contacted with the MAO/metallocene catalyst solution. Other methods and order of addition will be apparent to those skilled in the art.

The catalyst systems used to prepare the compositions of this invention are preferably supported using a porous particulate material, such as for example, talc, inorganic oxides, inorganic chlorides such as magnesium chloride, and resinous materials such as polyolefin or polymeric compounds.

Preferably, the support materials are porous inorganic oxide materials, which include those from the Periodic Table of Elements of Groups 2, 3, 4, 5, 13 or 14 metal/metalloid oxides. Silica, alumina, silica-alumina, and mixtures thereof are particularly preferable. Other inorganic oxides that may be employed either alone or in combination with the silica, alumina or silica-alumina are magnesia, titania, zirconia, and the like.

Preferably the support material is porous silica which has a surface area in the range of from 10 to 700 m$^2$/g, a total pore volume in the range of from 0.1 to 4.0 cc/g and an average particle size in the range of from 10 to 500 µm. More preferable, the surface area is in the range of from 50 to 500 m$^2$/g, the pore volume is in the range of from 0.5 to 3.5 cc/g and the average particle size is in the range of from 20 to 200 µm. Most desirably the surface area is in the range of 100 to 400 m2/g, the pore volume is in the range of from 0.8 to 3.0 cc/g and the average particle size is in the range of from 30 to 100 µm. The average pre size of typical porous support materials is in the range of from 10 to 1000 A. Preferably, a support material is used that has an average pore diameter of from 50 to 500 A, and most desirably from 75 to 350 A. It may be particularly desirable to dehydrate the silica at a temperature of from 100° C. to 800° C. anywhere from 3 to 24 hours.

The metallocene, activator and support material may be combined in any number of ways. More than one metallocene may also be used. Examples of suitable support techniques are described in U.S. Pat. Nos. 4,808,561 and 4,701,432 (each fully incorporated herein by reference). Preferably the metallocenes and activator are combined and their reaction product supported on the porous support material as described in U.S. Pat. No. 5,240,894 and WO 94/28034, WO 96/00243, and WO 96/00245 (each fully incorporated herein by reference). Alternatively, the metallocenes may be preactivated separately and then combined with the support material either separately or together. If the metallocenes are separately supported, then preferably, they are dried then combined as a powder before use in polymerization.

In another embodiment, the polymerization process includes the use of a Ziegler-Natta catalyst system. Examples of suitable catalysts systems and methods of production are found in U.S. Pat. Nos. 6,087,459, 5,948,839, 4,245,062, and 4,087,485. Examples of catalysts systems useful in the formation of the impact copolymer are Ziegler-Natta catalysts systems described in U.S. Pat. Nos. 4,990,479 and 5,159,021. For illustration, the Ziegler-Natta catalyst can be obtained by: (1) suspending a dialkoxy magnesium compound in an aromatic hydrocarbon that is liquid at ambient temperatures; (2) contacting the dialkoxy magnesium-hydrocarbon composition with a titanium halide and with a diester of an aromatic dicarboxylic acid; and (3) contacting the resulting functionalized dialkoxy magnesium-hydrocarbon composition of step (2) with additional titanium halide.

The Ziegler-Natta co-catalyst may be an organoaluminum compound that is halogen free. Suitable halogen free organoaluminum compounds are, in particular, branched unsubstituted alkylaluminum compounds of the formula AlR$_3$, where R denotes an alkyl radical having 1 to 10 carbon atoms, such as for example, trimethylaluminum, triethylaluminum, triisobutylaluminum and tridiisobutylaluminum. Additional compounds that are suitable for use as a co-catalyst are readily available and amply disclosed in the prior art including U.S. Pat. No. 4,990,477. The same or different Ziegler-Natta catalyst(s) may be used in both the initial and subsequent polymerization steps.

Electron donors are typically used in two ways in the formation of Ziegler-Natta catalysts and catalyst systems. An internal electron donor may be used in the formation reaction of the catalyst as the transition metal halide is reacted with the metal hydride or metal alkyl. Examples of internal electron donors include amines, amides, ethers, esters, aromatic esters, ketones, nitrites, phosphines, stilbenes, arsines, phosphoramides, thioethers, thioesters, aldehydes, alcoholates, and salts of organic acids. In conjunction with an internal donor, an external electron donor is also used in combination with a catalyst. External electron donors may affect the level of stereoregularity and MFR in polymerization reactions. External electron donor materials include organic silicon compounds, for example tetraethoxysilane ("TEOS"), dicyclopentyldimethoxysilane ("DCPMS") and, and propyltriethoxysilane ("PTES"). Internal and external-type electron donors are described, for example, in U.S. Pat. No. 4,535,068. The use of organic silicon compounds as external electron donors are described, for example, in U.S. Pat. Nos. 4,218, 339, 4,395,360, 4,328,122 and 4,473,660.

As described in U.S. Pat. No. 6,111,039, two different donors may be used, for example TEOS in the first liquid bulk reactor and TEOS and DCPMS in the second bulk liquid reactor. In the first bulk liquid reactor, the donor TEOS produces a high MFR polypropylene, and in the second bulk liquid reactor the combination of TEOS and DCPMS produces a low MFR polypropylene which is attributed to the dominance of DCPMS donor in presence of TEOS. This system is often termed "sequential donor" polymerization system.

The catalyst system may also comprise supports using methods and materials well within the skill in the art.

Any combination of the aforementioned catalyst systems may also be employed including a combination of metallocene catalysts and Ziegler-Natta type catalysts including supporting the aforementioned catalysts on the same support.

A stabilizer and a peroxide may be added to allow visbreaking in a following extrusion step conducted in an extruder. The amount of peroxide and the extruder operating conditions are controlled such that the extruded reactor ICP has the desired melt flow rate. The addition of the peroxide is particularly desirable when the ICP is produced using a Ziegler-Natta catalyst system. By maintaining a very high molecular weight in producing the polymerization steps and then visbreaking the copolymer in the extrusion step to yield a lower molecular weight product, a reactor ICP of the desired melt flow rate can be efficiently produced while avoiding potential fouling in the liquid polymerization step.

Embodiments of the polypropylene of the invention may contain a nucleating agent, an additive specifically utilized to increase the rate of crystallization of the polymer as it cools from the melt as compared to the same polymer in the absence of such an additive. There are many types of nucleating agents for polypropylene, which would are suitable for inclusion in the polypropylene formulations of this invention. Suitable nucleating agents are disclosed by, for example, H. N. Beck in *Heterogeneous Nucleating Agents for Polypropylene Crystallization*, 11 J. APPLIED POLY. SCI. 673-685 (1967) and in *Heterogeneous Nucleation Studies on Polypropylene*, 21 J. POLY. SCI.: POLY. LETTERS 347-351 (1983). Examples of suitable nucleating agents are sodium benzoate, sodium 2,2'-methylenebis(4,6-di-tert-butylphenyl)phosphate, aluminum 2,2'- methylenebis(4,6-di-tert-butylphenyl)phosphate, dibenzylidene sorbitol, di(p-tolylidene)sorbitol, di(p-ethylbenzylidene)sorbitol, bis(3,4-dimethylbenzylidene) sorbitol, and N',N'-dicyclohexyl-2,6-naphthalenedicarboxamide, and salts of disproportionated rosin esters. The foregoing list is intended to be illustrative of suitable choices of nucleating agents for inclusion in the subject polypropylene formulations, but it is not intended to limit in any way the nucleating agents which may be used.

Other additives may be included in the subject polypropylene formulations as suggested by the intended uses of the materials and the knowledge and experience of the formulator. In one embodiment, included in the polypropylene formulation is a primary antioxidant to deter oxidative degradation of the polymer and an acid scavenger to neutralized acid catalyst residues which may be present in the polymer to a greater or lesser extent. Examples of the former class of additives would be hindered phenolic antioxidants and hindered amine light stabilizers, examples and the application of which are well documented in the art. Examples of the latter category of additives would be metal salts of weak fatty acids such as sodium, calcium, or zinc stearate and weakly basic, naturally occurring minerals such as hydrotalcite or a synthetic equivalent like DHT-4A ($Mg_{4.5}Al_2(OH)_{13}CO_3 \cdot 5H_2O$, available from Kiowa Chemical Industry Co., Ltd.). As elsewhere in this specification, these listings of possible additives are meant to be illustrative but not limiting of the choices which may be employed.

In another embodiment, a secondary antioxidant is added to the resultant polypropylene pellets to stabilize the resins to oxidative degradation during high temperature processes to which they might be subjected or during very long storage periods at somewhat elevated temperatures. Representative examples of the former, high temperature stabilizers are organic phosphorous acid esters (phosphites) such as trinonylphenol phosphite and tris(2,4-di-t-butylphenyl)phosphite, and more recently discovered agents such as distearyl, hyroxylamine and 5,7-di-t-butyl-3-(3,4-dimethylphenyl)-3H-benzofuranone. The high temperature stabilizers include distearyl thiodipropionate and other fatty esters of thiodipropionic acid. Other agents of these types, which are too numerous to list here, may likewise be utilized, but the foregoing is a representative, non-limiting list of commonly used examples.

Many other types of additives could be optionally included in the resin formulations of this invention such as lubricants, antistatic agents, slip agents, anti-blocking agents, colorants, metal deactivators, mold release agents, fillers and reinforcements, fluorescent whitening agents, biostabilizers, and others.

Processing oils such as parraffinnic oils are substantially absent from the compositions of the invention. By "substantially absent", it is meant that processing oils are present, if at all, to an extent no greater than 1 wt % of the composition. In another embodiment, processing oils are present, if at all, to an extent no greater than 0.1 wt %. Further, cross-linking agents such as divinyl benzene, organic peroxides or other agents as described in, for example, JP 11181174, and other radical initiators are substantially absent, which means that they are present, if at all, to an extent no greater than 0.01 wt % of the composition. Finally, styrene-based polymers such as styrene-butadiene-styrene block copolymers disclosed in, for example, U.S. Pat. No. 6,060,551, are substantially absent from compositions of the invention, meaning that they are present, if at all, to an extent no greater than 1 wt % of the composition.

In some embodiments, the compositions of the invention are useful for articles requiring ductility at low temperatures (−20 to −40° C.) and moderate impact strength, while maintaining a shatter resistance such as automotive components, especially interior automotive components, such as instrument panel covers, dash board skin, interior fascia, and airbag covers, pillar trim, instrument panel trim, cartridges for headliners, sill plates, door trim panels, rear quarter panels, seat back covers, as well as exterior features such as air dams, exterior fascia, bumpers and lift gate panels. The compositions of the present invention are particularly useful for interior automotive components such as covers for airbags and pillar trim for side and curtain airbags. The airbag and tether (straps that hold the airbag to the vehicle) is packaged behind the head liner and pillar trim. As the airbag deploys, typically at 150 mph at −30° C., the pillar trim must be able to withstand the impact and/or flex away from the deploying bag. For front passenger seat airbags, the pillar trim is used to deflect the inflating airbag upward in the direction of the passenger. Again, the composition used to make the airbag cover must withstand the impact of the bag.

The compositions of the present invention are particularly well suited for use in unitary interior automotive components suitable for allowance of airbag deployment, while providing aesthetics and structural durability. By "unitary", it is meant that the component or article of manufacture is capable of being made as one part, or is in fact one part, being continuous even if including perforations, indentations, variations of thickness, or bent, etc. In one embodiment, the unitary component is made in one step such as one injection molding step. This is in contrast to, for example, a steering wheel cover, dashboard or dashboard skin that has an opening molded or cut therein to allow an airbag device to be placed behind the component, then closing the opening with a secondary piece that would allow deployment of the activated airbag (hence, being non-unitary).

For example, a unitary interior automotive component would be a dash board skin or instrument panel cover, trim panel, sill plate, or other items mentioned above that form one unit that may serve in part to cover an airbag and its ensuing components formed from the composition of the invention. Ideally, the unitary interior automotive component would be capable of being produced by standard commercial techniques such as thermoforming or injection molding, such that mass production is feasible and economical. Injection molding of multi-phase polymers, thermoforming, and other suitable processes are described in, for example, POLYPROPYLENE HANDBOOK 154-176, 333-348 (Edward P. Moore, ed., Hanser Publishing 1996), and is common in the art.

Thermoforming is a process of forming at least one pliable plastic sheet into a desired shape. In an embodiment of the present invention, the composition of the invention is thermoformed into a desirable shape, typically the shape of the end use article. An embodiment of the thermoforming sequence is described. First, the desired composition is placed on a shuttle rack to hold it during heating. The shuttle rack indexes into the oven which pre-heats the film or sheet of the composition before forming. Once the film is heated, the shuttle rack indexes back to the thermal forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperature of 170° C. to 185° C. A pre-stretched bubble step is used, especially on large parts, to improve material distribution. Plug-assisted forming is generally used for small deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform sidewall thickness. For a semicrystalline polymer such as polypropylene, fast plug speeds generally provide the best material distribution in the part.

The formed part is cooled in the mold. Sufficient cooling to maintain a mold temperature of 30° C. to 65° C. is needed. The part should be below 90° C. to 100° C. before ejection. For the best behavior in thermoforming, the lowest melt flow rate polymers are desirable.

Thus, one embodiment of the invention is a unitary interior automotive component including a composition of an impact copolymer and a plastomer, wherein the plastomer is a copolymer of ethylene derived units and at least one of $C_3$ to $C_8$ α-olefin derived units from 5 wt % to 35 wt % of the plastomer. The component may be injection molded in one embodiment, and thermoformed in another embodiment. The impact copolymer used may be a metallocene catalyzed, reactor produced copolymer in one embodiment, wherein the polypropylene component of the impact copolymer has an amorphous component of less than 3 wt % in one embodiment, and less than 2 wt % in another embodiment. The composition may have an MFR of from 5 to 40 g/10 min in one embodiment, and from 10 to 15 g/10 min in another embodiment. Further, the impact copolymer may comprises up to 30 wt % of rubber relative to the weight of the impact copolymer.

The composition of the present invention may also be useful for other exterior automotive parts such as bumper fascias, side cladding, bed-liners, wheel flares, fender extension, scuff molding, step pads, bumper end-caps, rocker covers, grilles, valence covers, cowl screen, and energy absorbing bumper beam structures, belly pans, side shields, fender liners. Other applications of the composition of the invention include child car seats, high chairs, baby bottles, cups, lawn tractor parts, ATV fenders, motor cycle fenders, snow mobile bodies, surf board covers, luggage, and tool boxes.

All patents, patent applications, test procedures (such as ASTM methods), priority documents, articles, publications, manuals, and other documents cited herein are fully incorporated by reference to the extent such disclosure is consistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the descriptions set forth herein but rather that the claims be construed as encompassing all the features of patentable novelty which reside in the present invention, including all features which would be treated as equivalents thereof by those skilled in the art to which the invention pertains.

What is claimed is:

1. A process to produce an impact copolymer comprising polypropylene and a rubber component, the process comprising contacting at least one catalyst system and monomers in a reactor system comprising a plurality of multi-zone circulating reactors connected in fluid communication, wherein each multi-zone circulating reactor comprises a first reaction zone connected to a second reaction zone, wherein the first reaction zone and the second reaction zone independently comprise a mass or gravity flow bed, a fluidized bed, a stirred bed, a fast fluidized bed, or a settled bed, and wherein polypropylene is produced in the first multi-zone circulating reactor and a rubber component is incorporated with the polypropylene in the second reactor to form the impact copolymer.

2. The process of claim 1, wherein the first reaction zone and the second reaction zone of each multi-zone circulating reactor are connected to provide for continuous circulation.

3. The process of claim 1, wherein the first reaction zone of each multi-zone circulating reactor comprises a fluidized bed and the second reactor zone of each multi-zone circulating reactor comprises a mass flow bed.

4. The process of claim 3, wherein the first reaction zone of each multi-zone circulating reactor comprises a first vertical cylindrical reactor, and the second reaction zone of each multi-zone circulating reactor comprises a second vertical cylindrical reactor.

5. The process of claim 4, wherein the upper region of the first reaction zone of each multi-zone circulating reactor is connected by a first line to an inlet of a solid-gas separator which is connected by its outlet for the solid to the upper region of the second reaction zone of each multi-zone circulating reactor; the lower region of the second reaction zone connected by a second line to the lower region of the first reaction zone; and the solid-gas separator connected by a recirculation line.

6. The process of claim 5, wherein the recirculation line provides for a gaseous mixture to enter the first reaction zone in a region at the bottom of the first reaction zone of each multi-zone circulating reactor and separate at the point of entry of the second line to the first reaction zone.

* * * * *